(12) United States Patent
Le et al.

(10) Patent No.: US 12,258,462 B2
(45) Date of Patent: Mar. 25, 2025

(54) COMPOSITION MADE FROM POLY(ARYLENE-ETHER-KETONE) (PAEK) WHICH IS STABLE IN THE MOLTEN STATE AND METHOD FOR STABILIZING SUCH A COMPOSITION

(71) Applicant: Arkema France, Colombes (FR)

(72) Inventors: Guillaume Le, Herouville Saint Clair (FR); Philippe Bussi, Colombes (FR)

(73) Assignee: ARKEMA FRANCE, Colombes (FR)

( * ) Notice: Subject to any disclaimer, the term of this patent is extended or adjusted under 35 U.S.C. 154(b) by 501 days.

(21) Appl. No.: 17/179,080

(22) Filed: Feb. 18, 2021

(65) Prior Publication Data

US 2021/0171732 A1    Jun. 10, 2021

Related U.S. Application Data

(63) Continuation-in-part of application No. 17/012,331, filed on Sep. 4, 2020, now abandoned, which is a continuation of application No. 15/746,131, filed on Jan. 19, 2018, now abandoned, and a continuation-in-part of application No. 15/746,142, filed as application No. PCT/FR2016/051894, filed as application No. PCT/FR2016/051895 on Jul. 21, 2016.

(30) Foreign Application Priority Data

Jul. 22, 2015  (FR) ..................... 1556931

(51) Int. Cl.
   *C08K 3/32* (2006.01)
   *C08G 65/40* (2006.01)
   *C08K 5/521* (2006.01)
   *C08L 71/00* (2006.01)

(52) U.S. Cl.
   CPC ............. *C08K 3/32* (2013.01); *C08G 65/40* (2013.01); *C08G 65/4012* (2013.01); *C08K 5/521* (2013.01); *C08L 71/00* (2013.01); *C08G 2650/40* (2013.01); *C08K 2003/322* (2013.01); *C08K 2003/324* (2013.01); *C08L 2201/08* (2013.01); *C08L 2205/025* (2013.01)

(58) Field of Classification Search
   None
   See application file for complete search history.

(56) References Cited

U.S. PATENT DOCUMENTS

| | | |
|---|---|---|
| 3,794,615 A | 2/1974 | Beverly |
| 3,925,307 A | 12/1975 | Dahl et al. |
| 4,567,029 A | 1/1986 | Wilson et al. |
| 4,593,061 A | 6/1986 | Vogdes et al. |
| 4,609,714 A | 9/1986 | Harris et al. |
| 4,874,839 A | 10/1989 | Montoya et al. |
| 4,977,230 A | 12/1990 | Nozawa et al. |
| 5,063,265 A | 11/1991 | Harris |
| 5,145,894 A | 9/1992 | Koch et al. |
| 5,208,278 A | 5/1993 | Koch et al. |
| 5,726,232 A | 3/1998 | Egami et al. |
| 9,879,127 B2 | 1/2018 | Mii et al. |
| 10,988,596 B2 * | 4/2021 | Le ..................... C08K 5/521 |
| 2004/0157967 A1 | 8/2004 | Ito |
| 2006/0052479 A1 | 3/2006 | Cougoulic |
| 2007/0082986 A1 | 4/2007 | Peters et al. |
| 2007/0265415 A1 | 11/2007 | Richter et al. |
| 2010/0028702 A1 | 2/2010 | Pierini et al. |
| 2010/0222486 A1 | 9/2010 | Toyohara et al. |
| 2011/0045087 A1 | 2/2011 | Kerr et al. |
| 2011/0104417 A1 | 5/2011 | Wang et al. |
| 2011/0151259 A1 | 6/2011 | Jarman-Smith et al. |
| 2011/0160364 A1 | 6/2011 | Toyohara et al. |
| 2013/0281587 A1 | 10/2013 | Shim et al. |
| 2016/0297929 A1 | 10/2016 | Zhang |
| 2018/0201759 A1 | 7/2018 | Le et al. |
| 2018/0208741 A1 | 7/2018 | Le et al. |

FOREIGN PATENT DOCUMENTS

| | | |
|---|---|---|
| CN | 1687201 A | 10/2005 |
| CN | 101864162 A | 10/2010 |
| CN | 102089360 A | 6/2011 |
| CN | 103665368 A | 3/2014 |
| DE | 4207555 A1 | 9/1993 |
| EP | 0132708 A2 | 2/1985 |
| EP | 0308803 A2 | 3/1989 |
| EP | 0933395 A2 | 8/1999 |
| EP | 1209190 A1 | 5/2002 |
| EP | 1209190 B1 | 3/2006 |
| EP | 2 169 012 A1 | 3/2010 |
| FR | 3039157 A1 | 1/2017 |

(Continued)

OTHER PUBLICATIONS

Notification of Opposition issued by the European Patent Office on Jul. 20, 2021 in European Patent Application 16757296.5-1107, (Arkema France), (25 pages).
Notification of Opposition issued by the European Patent Office on Jul. 16, 2021 in European Patent Application 16757296.5-1107, (Arkema France), (57 pages).
English Translation of JP H3-227320, previously cited on Feb. 18, 2021, 18 pages.
Kausch, "Advanced Thermoplastic Composites—Characterization and Processing", 4 pages.
M.Vaezi, et al."A novel bioactive PEEK/HA composite with Controlled 3D interconnected HA network", 2015, 12 pages.
Hydroxylapatit (Wikipedia), 8 pages.

(Continued)

*Primary Examiner* — Tae H Yoon
(74) *Attorney, Agent, or Firm* — Boone IP Law

(57) ABSTRACT

A composition based on poly(arylene ether ketone) (PAEK) which is stable in the molten state, characterized in that it includes a phosphate salt or a mixture of phosphate salts, a process for the stabilization of a composition based on PAEK incorporating said phosphate salts and objects manufactured using the composition.

25 Claims, 1 Drawing Sheet

(56) References Cited

FOREIGN PATENT DOCUMENTS

| | | |
|---|---|---|
| GB | 1446962 A | 8/1976 |
| GB | 2261667 A | 5/1993 |
| JP | S61225248 A | 10/1986 |
| JP | H01104650 A | 4/1989 |
| JP | H03227320 A | 10/1991 |
| JP | H04500088 A | 1/1992 |
| JP | H04-110339 A | 4/1992 |
| JP | H08259765 A | 10/1996 |
| JP | 2000-169738 A | 6/2000 |
| JP | 2001-059040 A | 3/2001 |
| JP | 2008050583 A | 3/2008 |
| JP | 2009-511665 A | 3/2009 |
| JP | 4420417 B2 | 12/2009 |
| JP | 2011511128 A | 4/2011 |
| JP | 2016538399 A | 12/2016 |
| JP | 2001-055395 A | 2/2021 |
| KR | 94-0000658 B1 | 1/1994 |
| KR | 10-2012-0104982 A | 9/2012 |
| WO | 9001510 A1 | 2/1990 |
| WO | 92/10542 A1 | 6/1992 |
| WO | 95/31502 A1 | 11/1995 |
| WO | 2013/114652 A1 | 8/2013 |
| WO | 2013164855 A2 | 11/2013 |
| WO | 2014148519 A1 | 9/2014 |
| WO | 2015078330 A1 | 6/2015 |
| WO | 2017013369 A1 | 1/2017 |

OTHER PUBLICATIONS

Ya-Wei Du et al. "Physical modification of polyetheretherketone D4 for orthopedic implants", 2014,Front. Mater. Sci., vol. 8, No. 4, pp. 313-324.
Heyden. H. (Silico-)Aluminophosphates: Synthesis and D7 Application for Heat Storage and Transformation, 2008, 245 pages.
Furio Cora et al.,"Ionicity and Framework Stability of Crystalline D8 Aluminophosphates", J. Phys. Chem. B 2001, vol. 105, pp. 10278-10281.
Aluminum phosphate (Wikipedia), 4 pages.
Phosphoric acid, aluminum sait (3:2)—PubChem, 2006, 1 page.
Natriumtrimetaphosphat (Wikipedia), 3 pages.
Metallorganische Chemie (Wikipedia), 4 pages.
Organometallic compounds (IUPAC Compendium of Chemical D14 Terminoloç:iv), 2014, 1 page.
Declaration (Affidavit) executed by Dr. James Pratte on Jun. 21, 2021, 2 pages.
Declaration (Affidavit) executed by Dr. Chantal Louis on Jun. 28, 2021, 5 pages.
E1_Rallis cert lot 207 for use in Lamart film run, Ceritficate of Analysis dated Mar. 24, 2009 of PEKK 60:40 DS-E Hi Purity Stabilized Grade, Lot 207/09, emitted by Rallis India Ltd. 2 pages.
E2_lot 207 used in ininity melt filtered, DS-E.pdf, email dated Oct. 13, 2009 from B. Tattersall to J. Banes re: DS-E pellets from Infinity to Ajedium, 3 pages.
E3_Ajedium film run sheet with infinity, lot 10091845.pdf, Ajedium Films run sheet dated May 10, 2009 relating to Shop Order# 09278-1, 2 pages.
E4_Ajedium film invoice using lot, 207.pdf, Ajedium Films invoice to Cyetc Engineered Materials Inc. dated Jun. 10, 2009 referring to Shop Order# 09278-1, 1 pages.
E5_Lamart PO acknowledgement, from Cytec for Cypek DS-E film.pdf, Purchase Order dated Sep. 14, 2009 from Lamart Corporation to Cytec, Engineered Materials Inc. for PEKK DS-E films. 5 pages.
E6_Ajedium packing list of shipping, Packing slips relating to shipments of PEKK DS-E films from Ajedium Films to Lamart Corporation according to Cytec sales order, 3 pages.
Decision of Rejection (Office Action) mailed Aug. 3, 2020 by the Japan Patent Office, JP Patent Application No. 2018-503131, 7 pages including English-language translation.
International Search Report (PCT/ISA/210) and Written Opinion (PCT/ISA/237) mailed on Oct. 27, 2016, by the European Patent Office as the International Searching Authority for International Application No. PCT/FR2016/051894.
International Search Report (PCT/ISA/210) with English translation and Written Opinion (PCT/ISA/237) mailed on Oct. 27, 2016, by the European Patent Office as the International Searching Authority for International Application No. PCT/FR2016/051895.
Notice of Grounds for Rejection (Office Action) issued by The Korean Intellectual Property Office in Korean Patent Application No. 10-2018-7005000, Jan. 28, 2020, 7 pages.
Notice of Grounds for Rejection (Office Action) issued by The Korean Intellectual Property Office in Korean Patent Application No. 10-2018-7005001, Jan. 28, 2020, 9 pages.
Notice of Reasons for Rejection (Office Action) issued Dec. 19, 2019 by the Japan Patent Office in Japanese Patent Application No. 2018-503131, 12 pages including English-language translation.
Official Action issued May 29, 2019 by the Korean Intellectual Property Office in Korean Patent Application No. 10-2018-7005001, 12 pages including English-language translation.
Official Action issued May 29, 2019 by the Korean Intellectual Property Office, in Korean Patent Application No. 10-2018-7005000, 12 pages including English-language translation.
Official Action issued Mar. 31, 2020 by the National Intellectual Property Administration of the People's Republic of China in Chinese Patent Application No. 201680042852.4, 6 pages.
Christie, D.M., et al., "Structural properties of a-berlinite (AIP04)", Physics and Chemistry of Minerals, vol. 25 , pp. 222-226.
Flanigen, Edith M., et al., "Aluminophosphate molecular sieves and the periodic table", Pure & Appl. Chem., vol. 58, No. 10, 1986, pp. 1351-1358.
Ho, K.K.C., et al., "Wet Impregnation as route to unidirectional carbon fibre reinforced thermoplastic composites manufacturing", Plastics, Rubber and Composites, 2011, vol. 40, No. 2, pp. 100-107, Maney Publishing, England, UK, pp. 100-107.
Le, Guillaume, et al., "Composition Made from Poly(arylene-ether-ketone) (PAEK) Stable in a Molten State", U.S. Appl. No. 17/012,331 entitled "Composition Made from Poly(arylene-ether-ketone) (PAEK) Stable in a Molten State," filed in the U.S. Patent and Trademark Office, filed Sep. 4, 2020.
Luan, Z., et al., "Tubular aluminophosphate mesoporous materials containing framework silicon vanadium and manganese", Mesoporous molecular sieves 1998: proceedings of the first international symposium, p. 103.
Notice of Opposition with Exhibits 1-9, filed in corresponding Japanese Patent No. 6,824,956 166 pages.
First Notice Reasons for Revocation from Opposition in corresponding Japanese Patent No. 6,824,956, dated Dec. 2, 2021, 15 pages (English translation only).
Second Notice Reasons for Revocation from Opposition in corresponding Japanese Patent No. 6,824,956, dated Sep. 9, 2022, 22 pages (English translation only).
Third Notice Reasons for Revocation from Opposition in corresponding Japanese Patent No. 6,824,956, dated Jul. 5, 2023, 26 pages (English translation only).
Exhibit 10—Su et al., "The assessment of fire suppression capability for the ammonium dihydrogen phosphate dry powder of commercial fire extinguishers," Pocedia Engineering 84, 2014, p. 485-490—filed in Opposition in corresponding Japanese Patent No. 6,824,956.
Exhibit 11—Experimental Results—filed in Opposition in corresponding Japanese Patent No. 6,824,956, dated Mar. 1, 2023, 5 pages.
D42—Experimental Report—Opposition in European Patent Application No. 16757296.5-1107, dated Dec. 6, 2021, 1 page.
D41—Auerbach, Handbook of Zeolite Science and Technology, 2003, 2 pages—Opposition in European Patent Application No. 16757296.5-1107.
D40—Rouquerol, Properties of Some Novel Absorbents, 1995, 2 pages—Opposition in European Patent Application No. 16757296.5-1107.
D43—Experimental Report—Opposition in European Patent Application No. 16757296.5-1107, dated Jun. 23, 2022, 3 pages.
D44'—Declaration of Jame Pratte—Opposition in European Patent Application No. 16757296.5-1107, dated Jan. 10, 2023, 2 pages.

(56) References Cited

OTHER PUBLICATIONS

D44—Experimental Report—Opposition in European Patent Application No. 16757296.5-1107, dated Jan. 10, 2023, 2 pages.
D45—Declaration of Chantal Louis—Opposition in European Patent Application No. 16757296.5-1107, dated Jan. 10, 2023, 5 pages.
Submission by Evonik—Opposition in European Patent Application No. 16757296.5-1107, dated Jan. 9, 2023, 16 pages.
Submission by Solvay—Opposition in European Patent Application No. 16757296.5-1107, dated Jan. 9, 2023, 11 pages.
Submission by Evonik—Opposition in European Patent Application No. 16757296.5-1107, dated Apr. 5, 2023, 4 pages.
D47—Experimental Report—Opposition in European Patent Application No. 16757296.5-1107, dated Jul. 8, 2023, 1 page.
Submission by Arkema—Opposition in European Patent Application No. 16757296.5-1107, dated Jul. 7, 2023, 11 pages.
Submission by Arkema—Opposition in European Patent Application No. 16757296.5-1107, dated Jan. 9, 2023, 9 pages.
Exhibit 12—Declaration by Dr. Kishagen—filed in Opposition in corresponding Japanese Patent No. 6,824,956, dated Mar. 1, 2023, 2 pages.
Written Submission in corresponding (Second) Indian Patent Application No. 201817001115, dated Oct. 1, 2018, 6 pages.
Hearing Notice in corresponding (Second) Indian Patent Application No. 201817001115, dated Jul. 3, 2021, 3 pages.
Affidavit of Guillaume LE in corresponding (First) Indian Patent Application No. 201817001105, dated Mar. 28, 2022, 4 pages.
Hearing Notice in corresponding (First) Indian Patent Application No. 201817001105, dated Jan. 4, 2022, 2 pages.
Written Submission in corresponding (First) Indian Patent Application No. 201817001105, dated Apr. 26, 2022, 9 pages.
Examination Report in corresponding (First) Indian Patent Application No. 201817001105, dated Mar. 9, 2020, 5 pages.
English Version of the Administrative Nullity Request (ANR) in Brazilian Patent Application No. BR 112018000895-8, published in Brazilian Industrial Property Journal (RPI) 2686, of Jun. 28, 2021, 26 pages.
Administrative nullity of patent of invention, utility model or certificate of addition of invention n Brazilian Patent Application No. BR 112018000895-8, on Jun. 20, 2023, 57 pages (English machine translation only).
Decision to grant a European patent received for European Application No. 16757296.5, mailed on Sep. 17, 2020, 2 pages.
Decision to Grant received for Japanese Patent Application No. 2018-503131, mailed on Jan. 4, 2021, 5 pages (2 pages of English Translation and 3 pages of Original Document).
Decision to Grant received for Japanese Patent Application No. 2018-503135, mailed on Dec. 2, 2019, 5 pages (2 pages of English Translation and 3 pages of Original Document).
Decision to Grant received for Japanese Patent Application No. 2020-200166, mailed on Jan. 30, 2023, 5 pages (2 pages of English Translation and 3 pages of Original Document).
European Search Report and Search Opinion received for European Application No. 20200205.1, mailed on Nov. 20, 2020, 7 pages.
Intention to Grant received for European Application No. 16757296.5, mailed on Jul. 14, 2020, 6 pages.
International Preliminary Report on Patentability received for PCT Patent Application No. PCT/FR16/051894, mailed on Feb. 1, 2018, 16 pages (9 pages of English Translation and 7 pages of Original Document).
International Preliminary Report on Patentability received for PCT Patent Application No. PCT/FR16/051895, mailed on Feb. 1, 2018, 16 pages (9 pages of English Translation and 7 pages of Original Document).
Notice of Allowance received for Chinese Patent Application No. 201680042844.X, mailed on Apr. 1, 2020, 4 pages (2 pages of English Translation and 2 pages of Original Document).
Notice of Allowance received for Chinese Patent Application No. 201680042852.4, mailed on Feb. 8, 2021, 3 pages (2 pages of English Translation and 1 page of Original Document).
Notice of Allowance received for Korean Patent Application No. 10-2018-7005000, mailed on Jul. 7, 2020, 4 pages (2 pages of English Translation and 2 pages of Original Document).
Notice of Allowance received for Korean Patent Application No. 10-2018-7005001, mailed on Jul. 7, 2020, 9 pages (2 pages of English Translation and 2 pages of Original Document).
Office Action received for Chinese Patent Application No. 201680042844.X, mailed on Aug. 8, 2019, 10 pages (5 pages of English Translation and 5 pages of Original Document).
Office Action received for Chinese Patent Application No. 201680042852.4, mailed on Jul. 31, 2019, 11 pages (6 pages of English Translation and 5 pages of Original Document).
Office Action received for European Application No. 16757296.5, mailed on Jan. 17, 2020, 5 pages.
Office Action received for European Application No. 16757297.3, mailed on Feb. 23, 2022, 5 pages.
Office Action received for Japanese Patent Application No. 2020-200166, mailed on Jan. 11, 2022, 6 pages (3 pages of English Translation and 3 pages of Original Document).
Office Action received for Japanese Patent Application No. 2020-200166, mailed on Jul. 25, 2022, 6 pages (3 pages of English Translation and 3 pages of Original Document).
Diacel Evonik, Vestakeep (Registered), Exhibit No. 5, 2007, 32 pages.
Evonik Industries, "Information for product inclusion in the SAP EHS system and the Creation of a safety data sheet", Exhibit No. 6, Oct. 7, 2008, 3 pages.
Evonik Industries, Exhibit No. 9, Jan. 19, 2023, 4 pages.
Evonik Industries, Vesakeep (Registered), Exhibit No. 7, 2008, 3 pages.
Intention to Grant received for European Application No. 16757297.3, mailed on Jan. 22, 2024, 7 pages.
Kausch., H. H., et al., "Advanced Thermoplastic Composites", Characterization and Processing, Aug. 31, 2021, 30 pages.
Notice of Opposition received for Japanese Patent Application No. 2020-200166, mailed on Sep. 12, 2023, 56 pages of Original document only.
Office Action received for Chinese Patent Application No. 202110270228.2, mailed on Feb. 24, 2023, 14 pages (8 pages of English Translation and 6 pages of Original Document).
Office Action received for Chinese Patent Application No. 202110270228.2, mailed on Nov. 8, 2023, 20 pages (11 pages of English Translation and 9 pages of Original Document).
Office Action received for European Application No. 20200205.1, mailed on Jan. 11, 2024, 5 pages.
Production of PEEK in a 2L reactor, Exhibit No. 8, Dec. 9, 2022, 12 pages.
Zhao, Y., et al., " Oilfield Chemistry", Binzhou Polytechnic University Press, Jan. 31, 2016.
Intermediate Opinion in Opposition Proceeding in Brazil for corresponding BR Patent 112018000895-8 B1 (English translation only).
Oilfield Chemistry, Zhao Yang, et al., Harbin Institute of Technology Press, p. 303, Jan. 31, 2016, 3 pages (relevance according to Official Action in corresponding Chinese Application No. 202110270228.2).
Official Action in corresponding Chinese Application No. 202110270228.2, mailed Nov. 8, 2023, 20 pages.
Exhibit 13 in Japanese Opposition No. 2021-700760 for Japanese Patent No. 6824956, 6 pages.
Notice of Reasons for Invalidation in Japanese Opposition No. 2021-700760 for Japanese Patent No. 6824956, mailed Jan. 16, 2014 (translation only), 26 Pages.
Preliminary Opinion of the Opposition Division, mailed on Nov. 30, 2023, by the European Patent Office for European Patent Application No. 16757296.5, 24 pages.
A. Jonas et al., Chapter 2, "PEEK Degradation and Its Influence on Crystallization Kinetics", Advanced Thermoplastic Composites: Characterization and Processing, Hanser Publishers, 1993, p. 57-81.
Notice of Reasons for Rejection, mailed on Apr. 15, 2024, by the Japanese Patent Office for Japanese Application No. 2023-030972, 6 pages.

(56) References Cited

OTHER PUBLICATIONS

D48—Experimental Report by Evonik—Opposition in European Patent Application No. 16757296.5-1107, submitted on Aug. 26, 2024, 8 pages (with translation).
Observations by Evonik—Opposition in European Patent Application No. 16757296.5-1107, submitted on Aug. 26, 2024, 30 pages (with translation).
D49—Evidence by Arkema—Opposition in European Patent Application No. 16757296.5-1107, submitted on Aug. 28, 2024, 3 pages.
D50—Evidence by Arkema—Opposition in European Patent Application No. 16757296.5-1107, submitted on Aug. 28, 2024, 2 pages.
D51—Evidence by Arkema—Opposition in European Patent Application No. 16757296.5-1107, submitted on Aug. 28, 2024, 3 pages.
Written Submission by Arkema—Opposition in European Patent Application No. 16757296.5-1107, submitted on Aug. 28, 2024, 12 pages (with translation).
Observations by Solvay—Opposition in European Patent Application No. 16757296.5-1107, submitted on Aug. 29, 2024, 15 pages.

\* cited by examiner

COMPOSITION MADE FROM POLY(ARYLENE-ETHER-KETONE) (PAEK) WHICH IS STABLE IN THE MOLTEN STATE AND METHOD FOR STABILIZING SUCH A COMPOSITION

CROSS REFERENCE TO RELATED APPLICATIONS

The present application is a continuation-in-part of U.S. application Ser. No. 17/012,331, filed on Sep. 4, 2020, now abandoned, which is a continuation of U.S. application Ser. No. 15/746,131, filed on Jan. 19, 2018, now abandoned, which is a U.S. National Stage of International Application No. PCT/FR2016/051894, filed on Jul. 21, 2016, which claims the benefit of French Application No. 1556931, filed on Jul. 22, 2015. The present application is also a continuation-in-part of U.S. application Ser. No. 15/746,142, filed on Jan. 19, 2018, now U.S. Pat. No. 10,988,596, which is a U.S. National Stage of International Application No. PCT/FR2016/051895, filed on Jul. 21, 2016, which claims the benefit of French Application No. 1556931, filed on Jul. 22, 2015. The entire contents of each of U.S. application Ser. No. 17/012,331, U.S. application Ser. No. 15/746,131, International Application No. PCT/FR2016/051894, U.S. application Ser. No. 15/746,142, International Application No. PCT/FR2016/051895, and French Application No. 1556931 are hereby incorporated herein by reference in their entirety.

TECHNICAL FIELD

The invention relates to the field of the poly(arylene ether ketone)s.

More particularly, the invention relates to a composition based on poly(arylene ether ketone) (PAEK) which is stable in the molten state, and to a process for the stabilization, in the molten state, of a composition based on PAEK.

BACKGROUND

The generic term of poly(arylene ether ketone) (PAEK) denotes a family of high-performance polymers with high thermomechanical properties. These polymers consist of aromatic rings linked by an oxygen atom (ether) and/or by a carbonyl group (ketone). Their properties mainly depend on the ether/ketone ratio. In the abbreviations used for naming the materials of the PAEK family, the letter E denotes an ether function and the letter K denotes a ketone function. In the remainder of the description, these abbreviations will be used instead of the customary names to denote the compounds to which they refer.

The PAEK family groups together, more particularly, poly(ether ketone) (PEK), poly(ether ether ketone) (PEEK), poly(ether ether ketone ketone) (PEEKK), poly(ether ketone ketone) (PEKK), poly(ether ketone ether ketone ketone) (PEKEKK), poly(ether ether ketone ether ketone) (PEEKEK), poly(ether ether ether ketone) (PEEEK) and poly(ether diphenyl ether ketone) (PEDEK).

These polymers are used for applications which are restrictive in terms of temperature and/or in terms of mechanical stresses, indeed even chemical stresses. These polymers are encountered in fields as varied as aeronautics, offshore drilling or medical implants. Depending on their nature and their applications, they may be processed by different known techniques such as molding, extrusion, compression molding, compounding, injection molding, calendering, thermoforming, rotational molding, impregnation, laser sintering or else fused deposition modeling (FDM) for example, at temperatures in general of between 320 and 430° C.

PAEKs have high melting points, typically greater than 300° C. Consequently, to be able to be processed, they must be melted at a high temperature, typically greater than 320° C., preferably greater than 350° C., and more generally at a temperature of the order of 350 to 390° C. These temperatures depend of course on the PAEK structures in question and on the viscosities. In the prior art, it is considered that it is necessary to melt PAEKs at a temperature greater by at least 20° C. than the melting point of the PAEK in question.

However, at such processing temperatures, the molten PAEKs are not stable with regard to thermal oxidation if their composition is not optimized and/or in the absence of additives which make it possible to stabilize the structure. Phenomena of structural change are then witnessed, either by chain cleavage and/or extension mechanisms, induced by branchings and/or couplings from chain ends or defects. These defects may come from oxidation reactions, under the effect of temperature and of dioxygen from the atmosphere or already present in the polymer. These structural changes may go as far as crosslinking of the polymer and also lead to the release of compounds, among which mention may be made of carbon dioxide ($CO_2$), carbon monoxide (CO), phenols and aromatic ethers. These phenomena of structural change lead to a deterioration in the physicochemical and/or mechanical properties of the PAEKs and to a change in their melt viscosity. These changes make the processing of these polymers in the molten state more difficult, inducing for example variations not only in the operating parameters of the machines used for transforming the polymers but also in the appearance and the dimensions of the products obtained after transformation.

Solutions have already been envisaged to stabilize the PAEK compositions in the molten state, but as yet they are not entirely satisfactory.

Document U.S. Pat. No. 5,208,278 describes the use of organic bases to stabilize PAEKs. According to the authors of this document, these organic bases make it possible to scavenge the acidity in the polymer. Examples show a better stability of the melt viscosity, but always in a confined medium, that is to say in the absence of an environment with dioxygen. In addition, the use of these organic bases is problematic since they may evaporate and/or they generate volatile organic compounds at the transformation temperatures of the PAEKs.

Stabilizers of metal oxide type, as described in the document U.S. Pat. No. 3,925,307, or aluminosilicates, as described in the document U.S. Pat. No. 4,593,061, also make it possible to scavenge acidity but do not make it possible to sufficiently improve the stability of the molten polymer with regard to thermal oxidation and may themselves generate structural changes. In addition, in order to achieve sufficient stability, it is necessary to add very large amounts of these additives which may then also have a filler action, impacting on the properties of the polymer and the processing thereof.

Documents U.S. Pat. Nos. 5,063,265, 5,145,894 and WO2013/164855 describe the use of aromatic organophosphorus compounds for stabilizing molten PAEK compositions, used either alone or in synergy with another additive. Document U.S. Pat. No. 5,063,265 describes, for example, the use of a phosphonite, and more particularly tetrakis(2,4-di-tert-butylphenyl) [1,1'-biphenyl]-4,4'-diyl bisphosphonite, subsequently denoted PEP-Q, and of an organic acid, for stabilizing PAEKs. Such organophosphorus compounds have a relatively low degree of oxidation. They are typically in oxidation state 2 or 3 and consequently assume the role of reducer of the peroxide groups in the molten polymer. A major drawback of these aromatic organophosphorus compounds such as phosphonites or phosphites for example lies in the fact that they are sensitive to hydrolysis and consequently it is very difficult to incorporate them via the aqueous route or during a synthesis process. In addition, they are not sufficiently stable at the transformation temperatures, with the result that they degrade and generate the emission of volatile organic compounds.

Now, for example in the field of manufacturing structural composites by impregnation, three main routes are possible:
  either impregnation is carried out by melting the polymer above its melting point and often in the presence of air. It is thus understood that the polymer matrix must not be too sensitive to thermal oxidation phenomena. In addition, if volatile organic compounds are generated, this may lead to defects in the impregnation, with the formation of porosities which may be detrimental to the properties of the final composite material,
  or a solvent route is used. However, PAEKs are only soluble in a few, generally highly acidic, organic solvents, or under hot conditions in heavy solvents such as diphenyl sulfone. In addition to the difficulty of using this type of solvent, it is very difficult to completely eliminate it, which may generate the same difficulties as the volatile organic compounds.
  or finally an aqueous suspension of PAEK powder is more generally used, such as described in the document entitled "Wet impregnation as route to unidirectional carbon fibre reinforced thermoplastic composites manufacturing", K.K.C.Ho et al., Plastics, Rubber and Composites, 2011, Vol. 40, No. 2, p. 100-107. Thus, for example, a suspension of PAEK powder and of a surfactant is used, which is deposited on carbon fibers or glass fibers, for example. The fibers are passed into an oven to evaporate the water, then into a die at high temperature, typically greater than 400° C., such that the polymer melts and coats the carbon fibers. The pre-impregnated strips obtained are then used to form composite objects by heating them again at high temperature.

Consequently, the fact that the stabilizer is sensitive to hydrolysis and degrades thermally poses a problem during the incorporation thereof into the molten polymer and/or during the high-temperature processing of the polymer. Moreover, the volatile organic compounds released during the degradation of the stabilizer have an unpleasant odor, are harmful to the environment and/or health, and create porosities in the composite material being manufactured, leading to mechanical defects in the finished composite part. Finally, during an impregnation of fibers, the volatile organic compounds emitted may also hinder the coating of the fibers and generate significant mechanical defects in the objects resulting therefrom.

Document WO9001510 describes a treatment of a powder of polymer of the PAEK family in an aqueous solution of a phosphate salt, at high temperature and under pressure for 3 hours to reduce the level of impurities. The polymer treated in this way is then filtered and washed with water three times, then dried for 16 hours. Nothing in this document indicates that the phosphate salt, which is water-soluble, effectively remains in the polymer powder. Moreover, the treatment described is onerous and lengthy to implement and is very different from additivation. Finally, nothing in this document states that it is effective against the phenomenon of thermal oxidation, since the stability is only evaluated in a confined medium. Indeed, phosphate salts are known for being used in other polymer matrices, such as polysulfones, or polyvinyl chlorides for example, to scavenge acidity and chlorides contained in the polymer. Such uses are for example described in documents U.S. Pat. No. 3,794,615 or EP 0 933 395 or else US52013/0281587 but in these cases also, no stabilizing action in the presence of air is described.

Technical Problem

The aim of the invention is thus to overcome at least one of the disadvantages of the prior art. In particular, the aim of the invention is to propose a composition based on PAEK, which is stable in the molten state with regard to thermal oxidation, and which does not generate the emission of volatile organic compounds.

The aim of the invention is also to propose a process for the stabilization, in the molten state, of a composition based on PAEK, with regard to thermal oxidation phenomena, and not only under the effect of temperature alone.

BRIEF DESCRIPTION

Surprisingly, it has been discovered that a composition based on poly(arylene ether ketone) (PAEK), characterized in that it comprises a phosphate salt or a mixture of phosphate salts, has a very high stability in the molten state with regard to thermal oxidation, even in the presence of air, without releasing volatile organic compounds, the stabilizer used being very stable at high temperature, typically greater than 350° C., and not being sensitive to hydrolysis. Since phosphate salt(s) are predominantly soluble in water, the incorporation thereof into the composition based on PAEK is thereby facilitated.

According to other optional characteristics of the composition:
  the phosphate salt(s) may be chosen from at least one of the following salts: one (or more) phosphate salt(s) of ammonium, of sodium, of calcium, of zinc, of aluminum, of potassium, of magnesium, of zirconium, of barium, of lithium, or of rare earths;
  the phosphate salt(s) may be chosen from at least one of the salts of formula:

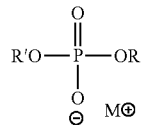

wherein R is or is not different from R', R and R' being formed by: a negative charge:⊖, an atom of hydrogen, or one or more aromatic groups which are substituted or unsubstituted by one or more groups having from 1 to 9 carbons, R and R' possibly being directly linked to one another or separated by at least one group chosen from the following groups: —CH$_2$—; —C(CH$_3$)$_2$—; —C(CF$_3$)$_2$—; —SO$_2$—; —S—; —CO—; —O—, and M represents an element from Group IA or IIA of the Periodic Table;
  the phosphate salt(s) may be non-organometallic;
  the phosphate salt(s) may be water-soluble;
  the phosphate salt(s) may be more particularly chosen from at least one of the following compounds: anhydrous monosodium phosphate, monosodium phosphate monohydrate or monosodium phosphate dihydrate, anhydrous disodium phosphate, disodium phosphate dihydrate, disodium phosphate heptahydrate, disodium phosphate octahydrate or disodium phosphate dodecahydrate, anhydrous hexagonal trisodium phosphate, anhydrous cubic trisodium phosphate, trisodium phosphate hemihydrate, trisodium phosphate hexahydrate, trisodium phosphate octahydrate, trisodium phosphate dodecahydrate, or ammonium dihydrogen phosphate;

the phosphate salt(s) may be one (or more) organometallic phosphate salt(s), and more particularly sodium 2,2'-methylenebis(4,6-di-tert-butylphenyl) phosphate;

the proportions of phosphate salt in the composition may be between 10 ppm and 50,000 ppm, preferably between 100 and 5000 ppm;

the composition based on PAEK may be more particularly a composition based on one of the following polymers: PEKK, PEEK, PEEKK, PEKEKK, PEEEK or PEDEK;

the composition based on PAEK may be more particularly a poly(ether ketone ketone) (PEKK) composition;

the composition based on PAEK may be more particularly a composition based on PEKK, and comprise, in addition to the PEKK, at least one of the following polymers: PEK, PEEEKK, PEEK, PEEKK, PEKEKK, PEEEK, PEDEK, with a content of less than 50% by weight of the composition, preferably less than or equal to 30% by weight of the composition;

the composition may comprise at least one filler and/or at least one other additive;

the composition may be stable in the molten state under nitrogen;

the composition may be stable in the molten state under air;

the percentage change in the viscosity of the composition, measured in a molten state, under air, with an oscillation frequency of 0.1 Hz, and with a strain amplitude of 0.5% may be lower than the one of said composition without the phosphate salt or the mixture of phosphate salts;

the phosphate salt, or the mixture of phosphate salts also may act as a nucleating agent within said composition;

the phosphate salt(s) may have been incorporated in the composition by wet impregnation of an aqueous solution thereof;

the phosphate salt or the mixture of phosphate salt(s) may have been incorporated by compounding;

the mixture of phosphate salts may be composed of monosodium phosphate and anhydrous disodium phosphate;

the composition may not comprise any phosphite and/or any phosphonate; or, the composition may be stable at a temperature of greater than 350° C.

Another subject of the invention is a process for the stabilization, in the molten state, of a composition based on PAEK, said process comprising a step of incorporating an agent which stabilizes with regard to the phenomena of thermal oxidation, said process being characterized in that the stabilizing agent incorporated is a phosphate salt or a mixture of phosphate salts.

Advantageously, the phosphate salt(s) may be incorporated into the composition based on PAEK by one of the following techniques: dry blending, compounding, wet impregnation or during the process for synthesizing the PAEK polymer.

Notably, water-soluble phosphate salt(s) may be incorporated into the composition based on PAEK by wet impregnation of an aqueous solution thereof.

The invention also relates to an object manufactured by a technology chosen from laser sintering, fused deposition modeling, molding, injection molding, extrusion, thermoforming, rotational molding, compounding, compression molding or impregnation, using a composition as described above.

Finally, the invention relates to a use of a phosphate salt to stabilize a composition based on poly(arylene ether ketone) (PAEK) in the molten state.

BRIEF DESCRIPTION OF THE DRAWINGS

Other advantages and features of the invention will become apparent on reading the following description given by way of illustrative and non-limiting example, with reference to the appended figures, of which.

DETAILED DESCRIPTION

Figure 1:
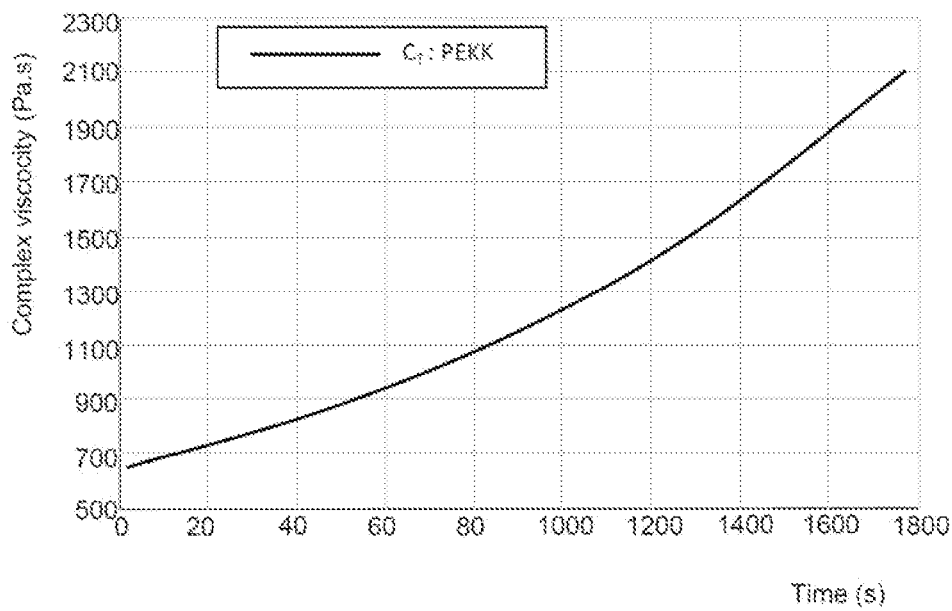
FIG. 1 represents a curve of the complex viscosity measured by an oscillating rheometer as a function of time of a non-stabilized reference product under nitrogen.

The poly(arylene ether ketone)s (PAEKs) used in the invention comprise units of the following formulae:

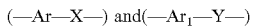

wherein:

Ar and $Ar_1$ each denote a divalent aromatic radical;

Ar and $Ar_1$ may preferably be chosen from 1,3-phenylene, 1,4-phenylene, 4,4'-biphenylene, 1,4-naphthylene, 1,5-naphthylene and 2,6-naphthylene;

X denotes an electron-withdrawing group; it may preferably be chosen from the carbonyl group and the sulfonyl group, Y denotes a group chosen from an oxygen atom, a sulfur atom, an alkylene group such as —$CH_2$— and isopropylidene.

In these units X and Y, at least 50%, preferably at least 70% and more particularly at least 80% of the groups X are a carbonyl group, and at least 50%, preferably at least 70% and more particularly at least 80% of the groups Y represent an oxygen atom.

According to a preferred embodiment, 100% of the groups X denote a carbonyl group and 100% of the groups Y represent an oxygen atom.

More preferentially, the poly(arylene ether ketone) (PAEK) may be chosen from:

a poly(ether ketone ketone), also referred to as PEKK, comprising units of formula I A, of formula I B, and the mixture thereof:

Formula IA

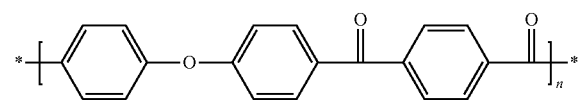

Formula IB

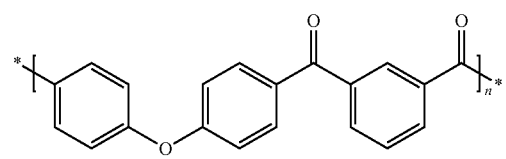

a poly(ether ether ketone), also referred to as PEEK, comprising units of formula IIA:

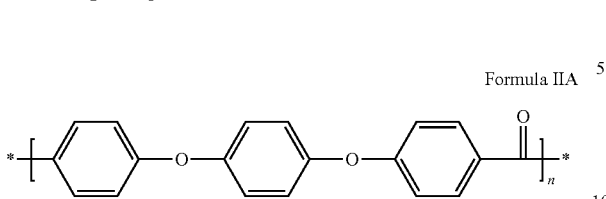

Formula IIA

Similarly, it is possible to introduce para sequences into these structures at the ethers and the ketones according to the formula IIB:

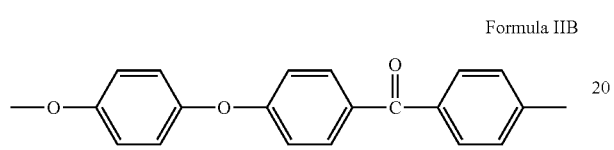

Formula IIB

The sequence may be totally para but it is also possible to introduce partially or totally meta sequences:

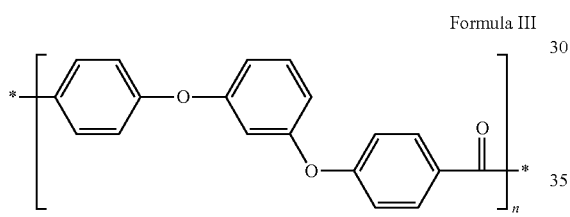

Formula III or else:

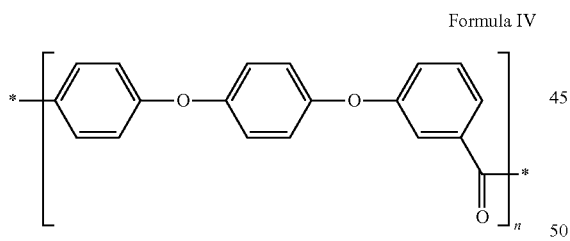

Formula IV or ortho sequences according to the formula V:

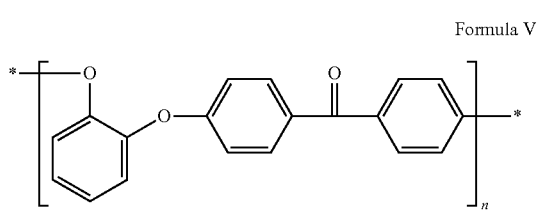

Formula V a poly(ether ketone), also referred to as PEK, comprising units of formula VI:

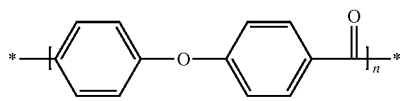

Formula VI

Similarly, the sequence may be totally para but it is also possible to introduce partially or totally meta sequences (formulae VII and VIII):

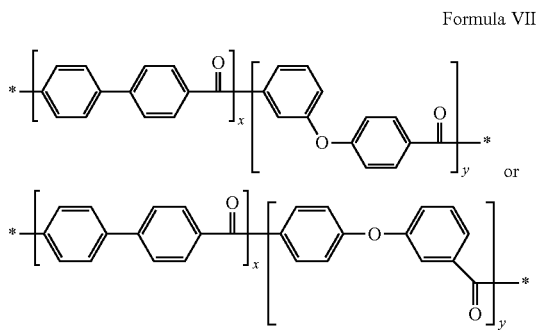

Formula VII a poly(ether ether ketone ketone), also referred to as PEEKK, comprising units of formula IX:

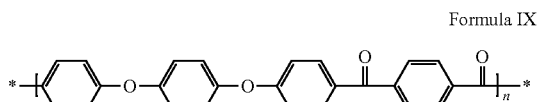

Formula IX

Similarly, it is possible to introduce meta sequences into these structures at the ethers and the ketones.

a poly(ether ether ether ketone), also referred to as PEEEK, comprising units of formula X:

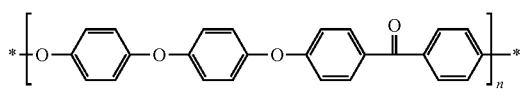

Formula X

Similarly, it is possible to introduce meta sequences into these structures at the ethers and the ketones, but also biphenol sequences according to the formula XI:

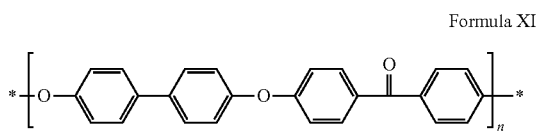

Formula XI

Other arrangements of the carbonyl group and of the oxygen atom may also be possible.

The composition which is a subject of the invention is based on PAEK. More particularly, in some embodiments, the composition may be a composition based on poly(ether ketone ketone) (PEKK).

According to one variant embodiment, the composition based on PAEK may also be a composition based on one of the following polymers: PEEK, PEEKK, PEKEKK, PEEEK or PEDEK.

The composition based on PAEK may also be a composition based on a mixture of polymers of the PAEK family. Thus, the composition may be based on PEKK and comprise, in addition to the PEKK, at least one of the following polymers: PEK, PEEKEK, PEEK, PEEKK, PEKEKK, PEEEK, PEDEK, with a content of less than 50% by weight of the composition, preferably less than or equal to 30% by weight of the composition.

Advantageously, the PAEK composition according to the invention is stable in the molten state by virtue of the incorporation of a phosphate salt in the composition.

In the present description, "polymer stable in the molten state" means a polymer, the structure of which barely changes when it is molten, so that the physicochemical properties thereof, especially the viscosity, only vary within a limited range. More specifically, a polymer will be considered to be stable in the molten state under nitrogen when the change in the viscosity thereof in the molten state in 30 minutes, measured by an oscillating rheometer under nitrogen and with an oscillation frequency of 1 Hz, at 380° C. or 20° C. above the melting point thereof when said melting point is greater than 370° C., is less than 100%, especially less than 50%, in particular less than 20%, and most particularly between −20% and +20%. Likewise, a polymer will be considered to be stable in the molten state under air when the change in the viscosity thereof in the molten state in 30 minutes, measured as indicated above but under air and with an oscillation frequency of 0.1 Hz, is less than 150%, especially less than 100%, in particular less than 50%, and most particularly between −20% and +50%.

According to one variant, the stabilizer incorporated into the composition may be a mixture of phosphate salts.

Indeed, it has been discovered that such a phosphate salt makes it possible to stabilize a PAEK composition in the molten state just as well under nitrogen as under air. This effect of stabilizing the PAEK in the molten state under air is very surprising, and it was not at all intuitive for those skilled in the art to choose to incorporate a phosphate salt to stabilize a PAEK in the molten state with regard to a phenomenon of thermal oxidation. Indeed, a phosphate salt has a maximum degree of oxidation, with the result that it is not known to be an antioxidant. Yet, in the presence of the oxygen in the air, it manages to stabilize the polymer in the molten state with regard to the phenomenon of thermal oxidation. Indeed, a more stable viscosity of the composition in the molten state is obtained compared to one and the same composition devoid of phosphate salt, which means that the phenomena of chain extension through phenomena of branching, inter alia, are more limited.

The phosphate salt is therefore present as an active agent stabilizing PAEK compositions in the molten state, even in the presence of air, with as great an effectiveness as an aromatic organophosphorus compound. Nonetheless, it also has a considerable advantage relative to an aromatic organophosphorus compound since it does not hydrolyze and does not generate any emission of volatile organic compounds. Only water may be generated in certain cases in which the phosphate salt is present in a hydrated form or when the phosphate salt dimerizes.

Advantageously, one or more phosphate salt(s) may be incorporated into the composition based on PAEK. The phosphate salt is advantageously chosen from one (or more) phosphate salt(s) of ammonium, of sodium, of calcium, of zinc, of aluminum, of potassium, of magnesium, of zirconium, of barium, of lithium or of rare earths. Preferably, the phosphate salt(s) is (are) one (or more) inorganic or organometallic phosphate salt(s).

According to some embodiments, the phosphate salt(s) used may have the following formula:

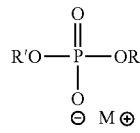

wherein R is or is not different from R', R and R' being formed by: a negative charge:⊖, an atom of hydrogen, or one or more aromatic groups which are substituted or unsubstituted by one or more groups having from 1 to 9 carbons, R and R' possibly being directly linked to one another or separated by at least one group chosen from the following groups: —CH$_2$—; —C(CH$_3$)$_2$—; —C(CF$_3$)$_2$—; —SO$_2$—; —S—; —CO—; —O—, and M represents an element from Group IA or IIA of the Periodic Table.

According to some embodiments, the phosphate salt(s) used may have the following formula:

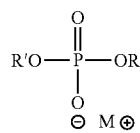

wherein R is or is not different from R', R and R' being formed by one or more aromatic groups which are substituted or unsubstituted by one or more groups having from 1 to 9 carbons, R and R' possibly being directly linked to one another or separated by at least one group chosen from the following groups: —CH$_2$—; —C(CH$_3$)$_2$—; —C(CF$_3$)$_2$—; —SO$_2$; —S—; —CO—; —O—, and M represents an element from Group IA or IIA of the Periodic Table.

The phosphate salt(s) may be more particularly chosen from at least one of the following compounds: anhydrous monosodium phosphate, monosodium phosphate monohydrate or monosodium phosphate dihydrate, anhydrous disodium phosphate, disodium phosphate dihydrate, disodium phosphate heptahydrate, disodium phosphate octahydrate or disodium phosphate dodecahydrate, anhydrous hexagonal trisodium phosphate, anhydrous cubic trisodium phosphate, trisodium phosphate hemihydrate, trisodium phosphate hexahydrate, trisodium phosphate octahydrate, trisodium phosphate dodecahydrate, and/or ammonium dihydrogen phosphate.

According to some embodiments, the phosphate salt(s) may be more an organometallic phosphate salt. It may preferably be sodium 2,2'-methylenebis(4,6-di-tert-butylphenyl) phosphate.

Preferably, the phosphate salt, or the mixture of phosphate salts, may be incorporated into the composition based on PAEK in proportions of between 10 ppm and 50,000 ppm, and even more preferably between 100 and 5000 ppm.

Another surprising effect linked to the incorporation of the phosphate salt into the composition based on PAEK lies in the fact that it makes it possible to act as a nucleating agent. Increasing the crystallization kinetics to make a crystallizable product therefrom under standard transformation conditions, or for example in laser sintering, and thus to have a semicrystalline PEKK, is advantageous for certain properties such as chemical resistance. Moreover, such a nucleating agent makes it possible to control the crystalline morphology of the polymer, and especially the size of the crystalline zones (or spherulites), in order to ensure a consistency in the mechanical properties of the polymer, regardless of the processing conditions of the polymer.

The invention also relates to a process for the stabilization, in the molten state, of a composition based on PAEK, said process comprising a step of incorporating an agent which stabilizes with regard to the phenomena of thermal oxidation, said process being characterized in that the stabilizing agent incorporated is a phosphate salt or a mixture of phosphate salts.

The phosphate salt may be incorporated into the composition based on PAEK by one of the following techniques: dry blending, compounding, wet impregnation or during the process for synthesizing the PAEK polymer.

The process for synthesizing a PAEK generally consists of a polycondensation. The synthesis may be carried out according to two routes: a nucleophilic route, according to which ether bonds form during the polymerization step, or an electrophilic route, according to which carbonyl bridges form during the polymerization step. PEKK, for example, results from a Friedel-Crafts polycondensation reaction between DPE (diphenyl ether) and a terephthaloyl chloride and/or an isophthaloyl chloride, for example.

When the stabilized composition based on PAEK is obtained by impregnation of PAEK during the process for obtaining same, this impregnation of the PAEK by a solution of phosphate salt(s) is carried out after the polymerization of the PAEK and before the drying thereof. The solvent is chosen so that it is able to dissolve the metallic phosphate salt(s) while being also soluble with the solvent phase constituting at least 50% of the PAEK grain. This impregnation is advantageously carried out with stirring to promote homogenization. Advantageously, a PAEK wet with water and an aqueous solution of metallic phosphate salt(s) are chosen.

Advantageously, the stabilized composition based on PAEK may be obtained in the form of granules by compounding on a device known to those skilled in the art, such as a twin-screw extruder, a co-kneader or an internal mixer.

The composition prepared in this way may then be transformed for a use or a subsequent transformation known to those skilled in the art by means of devices such as an injection-molding machine, an extruder, laser sintering equipment, etc.

The process for preparing the composition according to the invention may also use a twin-screw extruder feeding, without intermediate granulation, an injection-molding machine or an extruder according to a processing device known to those skilled in the art.

The stabilized composition based on PAEK may also be obtained in powder form, by dry blending, for example. Thus, the PAEK is mixed with the phosphate salt(s) and then this mixture is heated above the melting point of the PAEK with stirring in a suitable apparatus, such as an extruder.

The stabilized composition based on PAEK may also be obtained by wet blending. For this purpose, the dried PAEK is impregnated with a solution of the metallic phosphate salt(s). This solution is preferably aqueous if the phosphate salt(s) is (are) water-soluble. Mixing is preferably carried out with stirring to promote homogenization. The mixture is then dried and the solvent is thus removed.

Using the composition obtained, which may either be in the form of granules or in the form of a powder, it is possible to manufacture various objects by a technique of laser sintering, injection molding or extrusion, thermoforming, rotational molding, compression molding or else impregnation, for example.

Wet impregnation, for example, for manufacturing pre-impregnated composite strips, also referred to as tape, consists in depositing an aqueous dispersion of a PAEK powder and of phosphate salt(s) on carbon or glass fibers, for example. More particularly, the dispersion may for example comprise a PEKK powder and phosphate salt(s) and a surfactant in aqueous solution. The fibers thus covered with the aqueous dispersion are then passed into an oven to evaporate the water. They are then passed into a die at high temperature, typically of greater than 370° C., in order to be able to melt the stabilized PEKK polymer and for it to be able to correctly coat the fibers. After cooling, tapes or pre-impregnated strips are obtained which are then used by assembling and/or superimposing them, to remelt them and form composite objects.

One major advantage of phosphate salts lies in the fact that, even heated to a very high temperature, greater than or equal to 350° C. for example, they do not generate the emission of volatile organic compounds but they simply lose water in the form of vapor. Consequently, phosphate salts do not present any risk for the environment and/or health and they do not create porosities liable to hinder the coating of the fibers and/or to generate the appearance of defects in the final manufactured object, liable to then lead to a deterioration in the mechanical properties.

The composition based on PAEK and on phosphate salt(s) as defined above may be prepared by any known method making it possible to obtain a homogeneous mixture containing the composition according to the invention and optionally other additives, fillers or other polymers. Such a method may be chosen from techniques of dry blending (using, for example, a roll mill), of melt extrusion, of compounding or else of wet impregnation or during the process for synthesizing the polymer.

More particularly, the composition according to the invention may be prepared by melt blending all the components thereof, especially in a "direct" process.

Compounding, for example, is a process which makes it possible to mix, by melting, plastic materials and/or additives and/or fillers. In order to manufacture the composition, the starting materials, present in the form of granules, are placed in a co-rotating twin-screw extruder.

The following examples nonlimitingly illustrate the scope of the invention:

Example 1: Measurements of Viscosity Under Nitrogen

Several compositions based on PEKK were prepared. A control composition $C_T$ of PEKK comprising no stabilizer was prepared by a conventional synthesis process by a polycondensation reaction.

A second composition based on PEKK, with the reference C1, was prepared by wet impregnation, wherein PEP-Q (tetrakis(2,4-di-tert-butylphenyl) [1,1'-biphenyl]-4,4'-diyl bisphosphonite), of formula (1) below, was incorporated at an amount of 1000 ppm. This phosphonite is used as comparative example for stabilizing the PEKK composition.

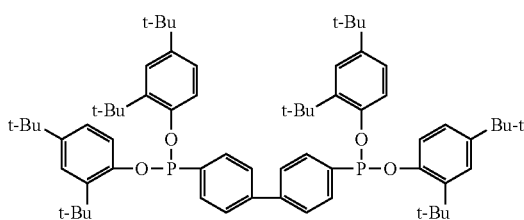

(1)

A third composition based on PEKK, with the reference C2, was prepared by aqueous impregnation, wherein anhydrous monosodium phosphate ($NaH_2PO_4$), also referred to as sodium dihydrogen phosphate, of formula (2) below, was incorporated at an amount of 1000 ppm.

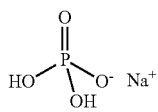

(2)

A fourth composition based on PEKK, with the reference C3, was prepared in the same manner as the second and third compositions, by aqueous impregnation, wherein sodium trimetaphosphate ($Na_3P_3O_9$), also referred to as anhydrous trisodium phosphate, of formula (3) below, was incorporated at an amount of 1000 ppm.

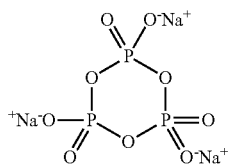

(3)

A fifth composition based on PEKK, with the reference C4, was prepared in the same manner as the preceding compositions, by impregnation with acetone, wherein an organic phosphate, and more particularly triphenyl phosphate, of formula (4) below, was incorporated at an amount of 1000 ppm.

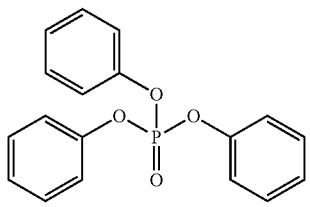

(4)

The melt viscosity of these compositions $C_T$ to C4 was then measured with an oscillating rheometer as a function of time, at 380° C., under nitrogen, with an oscillation frequency, also referred to as stress, of 1 Hz, and with a strain amplitude of 0.5%.

The curve of FIG. 1 represents the viscosity of the control composition $C_T$ of PEKK, measured in this way. From the initial viscosity and the viscosity after a duration of 30 minutes, the stability of the polymer over time is then calculated, expressed as percentage change in the viscosity (EV %), at 380° C. The stability of the polymer is then calculated according to the following formula:

% $EV$=(viscosity at 30 min-initial viscosity)/initial viscosity*100

It emerges from the curve of FIG. 1 that the stability, expressed as percentage change in the viscosity EV, of the control composition $C_T$ based on PEKK-based polymer, under nitrogen with a 1 Hz stress, is equal to 160%.

Table I below brings together the data on stability (EV %) under nitrogen of the different compositions $C_T$ to C4 obtained by wet impregnation, with or without stabilizer.

TABLE I

| Reference | Composition | EV (%) (under $N_2$, 1 Hz) |
|---|---|---|
| $C_T$ | Reference PEKK | 160% |
| C1 | 1000 ppm PEP-Q | 50% |
| C2 | 1000 ppm of anhydrous monosodium phosphate | 50% |
| C3 | 1000 ppm of anhydrous trisodium phosphate | 50% |
| C4 | 1000 ppm of triphenyl phosphate | 110% |

It emerges from the results presented in table I that the presence of a phosphate salt in a composition based on PEKK makes it possible to obtain a composition in the molten state which has a more stable viscosity over time, unlike the control composition $C_T$, the viscosity of which increases rapidly with time, indicating chain extensions and therefore significant changes in the characteristics of the polymer.

While the organic phosphate (in composition C4) has a lesser effect compared to the phosphate salts, it also makes it possible to obtain a composition in the molten state having a more stable viscosity than the control composition $C_T$ of PEKK.

Example 2: Measurements of Viscosity Under Nitrogen and Under Air

Several compounds based on PEKK were prepared by the compounding technique. The different compounds are produced with an extruder from several compositions based on PEKK. The behavior of the different compositions at 380° C. under nitrogen and under air was compared.

A first control composition $C_T'$ of PEKK in the form of granules and not comprising any stabilizer was prepared.

A second composition based on PEKK, with the reference C5, was prepared by the compounding technique, wherein monosodium phosphate ($NaH_2PO_4$), of formula (1) above, was incorporated at an amount of 1000 ppm.

A third composition based on PEKK, with the reference C6, was prepared by the compounding technique, wherein trisodium phosphate ($Na_3P_3O_9$), of formula (3) above, was incorporated at an amount of 1000 ppm.

A fourth composition based on PEKK, with the reference C7, was prepared by the compounding technique, wherein ADK STAB NA-11UH (sodium 2,2'-methylene-bis(4,6-di-tert-butylphenyl) phosphate), of formula (5) below, was incorporated at an amount of 1000 ppm.

(5)

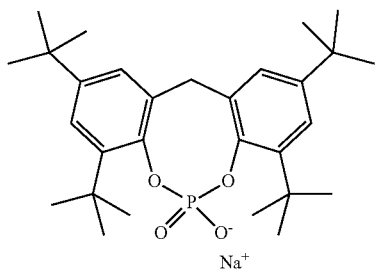

The melt viscosity of these compositions $C_T'$, C5, C6 and C7 was then measured with an oscillating rheometer as a function of time, at 380° C., under nitrogen then under air, with an oscillation frequency, also referred to as stress, respectively of 1 Hz and of 0.1 Hz, and with a strain amplitude of 0.5%.

Table II below brings together the data on stability (EV %) under nitrogen and under air of these different compositions obtained by compounding, with or without stabilizer.

TABLE II

| Reference | Composition | EV (%) (under $N_2$, 1 Hz) | EV (%) (under air, 0.1 Hz) |
|---|---|---|---|
| $C_T'$ | Granulated PEKK | 230% | 390% |
| C5 | 1000 ppm of anhydrous monosodium phosphate | 30% | 115% |
| C6 | 1000 ppm of anhydrous trisodium phosphate | 45% | 115% |
| C7 | 1000 ppm of sodium 2,2'-methylene-bis(4,6-di-tert-butylphenyl) phosphate | 15% | 2% |

It emerges from the results of table II that the phosphate salts are good stabilizers of the PEKK, equally well under nitrogen as under air. The most surprising phenomenon of stabilization lies in the fact that, even under air, the viscosity measured in the molten state remains relatively stable. The phosphate salts are therefore stabilizing agents which are highly effective with regard to the phenomenon of thermal oxidation, even in the presence of air.

Example 3: Influence of the Ratio of Phosphate Salt Incorporated

Several compositions based on PEKK were prepared. A control composition $C_T$ of PEKK comprising no stabilizer was prepared by a conventional synthesis process by a polycondensation reaction. The other compositions are based on PEKK and each comprise anhydrous trisodium phosphate at different contents.

The compositions compared are prepared by aqueous impregnation.

The composition with the reference C8 in table III below comprises 500 ppm of anhydrous trisodium phosphate, while the composition with the reference C9 comprises 1000 ppm thereof and the composition with the reference C10 comprises 3000 ppm thereof.

The melt viscosity of these compositions $C_T$, C8, C9 and C10 was then measured with an oscillating rheometer as a function of time, at 380° C., under nitrogen, with a stress of 1 Hz and with a strain amplitude of 0.5%.

Table III below brings together the data on stability (EV %) under nitrogen of these different compositions.

TABLE III

| Reference | Composition | EV (%) (under $N_2$, 1 Hz) |
|---|---|---|
| $C_T$ | Reference PEKK | 160% |
| C8 | 500 ppm of anhydrous trisodium phosphate | 50% |
| C9 | 1000 ppm of anhydrous trisodium phosphate | 45% |
| C10 | 3000 ppm of anhydrous trisodium phosphate | 10% |

It emerges from this table III that the stability over time of the viscosity of the composition in the molten state increases with the content of phosphate salt.

Example 4: Influence of the Cation

Several compositions based on PEKK were prepared. A control composition $C_T$ of PEKK comprising no stabilizer was prepared by a conventional synthesis process by a polycondensation reaction. The other compositions are based on PEKK and each comprise a dihydrogen phosphate with a different counter-anion.

The composition with the reference C11 in table IV below comprises 1000 ppm of anhydrous sodium dihydrogen phosphate (of formula (1) above), while the composition with the reference C12 comprises 1000 ppm of ammonium dihydrogen phosphate.

The melt viscosity of these compositions $C_T$, C11 and C12 was then measured with an oscillating rheometer as a function of time, at 380° C., under nitrogen, with a stress of 1 Hz and with a strain amplitude of 0.5%.

Table IV below brings together the data on stability (EV %) under nitrogen of these different compositions.

TABLE IV

| Reference | Composition | EV (%) (under $N_2$, 1 Hz) |
|---|---|---|
| $C_T$ | Reference PEKK | 160% |
| C11 | 1000 ppm of anhydrous sodium dihydrogen phosphate | 50% |
| C12 | 1000 ppm of ammonium dihydrogen phosphate | 55% |

It emerges from this table IV that the presence of ammonium dihydrogen phosphate or of anhydrous sodium dihydrogen phosphate in a composition based on PEKK makes it possible to obtain a composition in the molten state which has a more stable viscosity over time, unlike the control composition $C_T$, the viscosity of which increases rapidly with time, indicating chain extensions and therefore significant changes in the characteristics of the polymer.

Example 5: Phosphate Salt Mixture

A composition based on PEKK, with the reference C13, was prepared by aqueous impregnation, wherein anhydrous monosodium phosphate ($NaH_2PO_4$), was incorporated at an amount of 2500 ppm.

A composition based on PEKK, with the reference C14, was prepared by aqueous impregnation, wherein a (1.5:1) (wt:wt) mixture of anhydrous monosodium phosphate and anhydrous disodium phosphate ($Na_2HPO_4$), of formula (6) below, was incorporated at an amount of 2500 ppm.

(6)

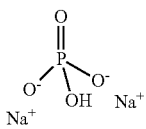

The melt viscosity of these compositions was then measured with an oscillating rheometer as a function of time, at 380° C., under nitrogen, with an oscillation frequency, also referred to as stress, of 1 Hz, and with a strain amplitude of 0.5%.

From the initial viscosity and the viscosity after a duration of 60 minutes, the stability of the polymer over time is then calculated, expressed as percentage change in the viscosity (EV' %), at 380° C., according to the following formula:

% EV'=(viscosity at 60 min-initial viscosity)/initial viscosity*100

Table V below brings together the data on stability (EV'%) under nitrogen of the different compositions $C_T$ C13 and C14.

TABLE V

| Reference | Composition | EV' (%) (60 minutes, under $N_2$, 1 Hz) |
|---|---|---|
| C13 | 2500 ppm of $NaH_2PO_4$ | 15 |
| C14 | 2500 ppm of a mixture (1.5:1)(wt:wt) ($NaH_2PO_4$:$Na_2HPO_4$) | 22 |

It emerges from this table V that the mixture of ($NaH_2PO_4$:$Na_2HPO_4$) may bring a relatively similar stabilization than $NaH_2PO_4$ alone.

Example 6: Thermal Stability

The phosphate salts incorporated into the composition based on PAEK are moreover highly stable thermally. Indeed, for the phosphate salts, the losses of weight measured correspond to losses of water. The phenomenon which is then occurring, for example with monosodium phosphate, is a dehydration and a dimerization in accordance with the following equation (A):

(A)

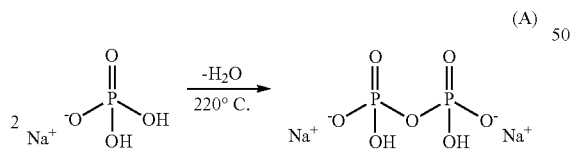

For its part, PEP-Q begins to degrade and to emit organic compounds at a temperature of the order of 200° C.

Figure 2:
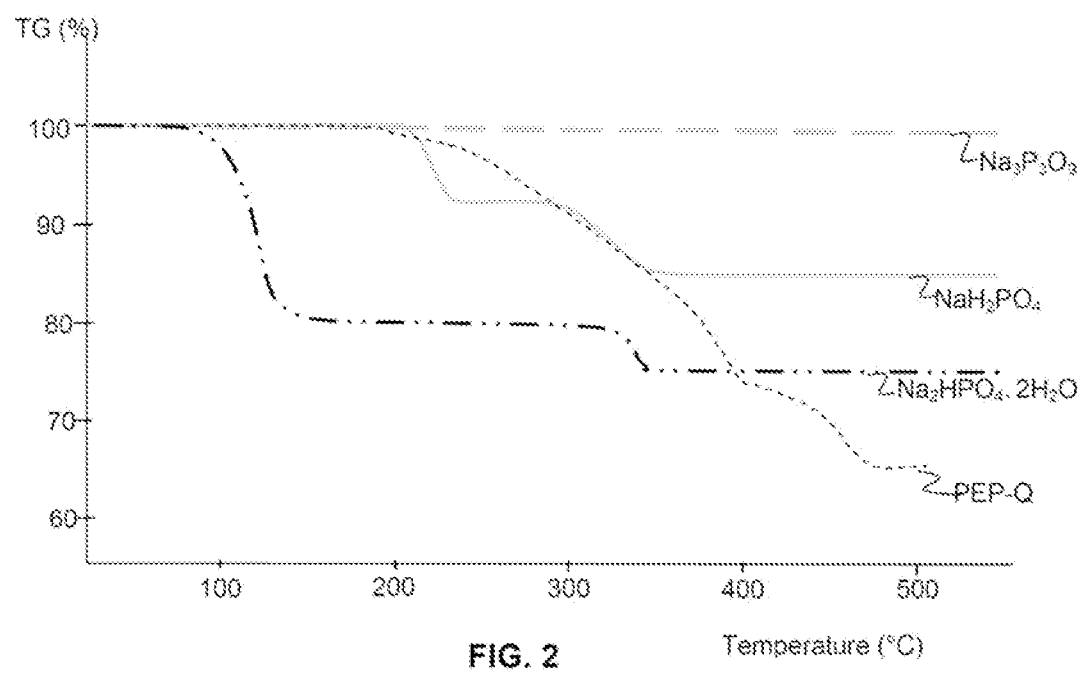
FIG. 2 represents a thermogravimetric curve as a function of temperature of a reference stabilizer used by way of comparison.

The thermogravimetric (TG) curves as a function of temperature T (° C.) presented in the graph of FIG. 2 make it possible to demonstrate a loss of weight of the phosphate salts due to a loss of water, whereas the phosphonite PEP-Q degrades rapidly from 200° C., emitting volatile organic compounds.

The phosphate salts therefore have a high thermal stability combined with a high stability with regard to phenomena of thermal oxidation.

Example 7: Effect of Additional Nucleation of the Phosphate Salts

A study of crystallization was performed on different samples, with the references E1 to E4, of different compositions and listed in table V below.

The crystallization study is performed by differential scanning calorimetry, denoted DSC. DSC is a thermal analysis technique which makes it possible to measure the differences in the exchanges of heat between a sample to be analyzed and a reference.

In order to perform this crystallization study, the apparatus Q 2000 from TA Instruments was used. The study was performed in anisothermal and isothermal crystallization.

The samples studied are in the form of granules. A control sample based on PEKK, with the reference E1, is compared to samples E2 and E3 based on PEKK and on a phosphate salt in the same proportions. The different samples are more particularly described in table V below.

Anisothermal Crystallization

The protocol for DSC under anisothermal conditions on the different samples E1 to E3 first consists in stabilizing the temperature at 20° C. The temperature is then gradually increased according to a gradient of 20° C. per minute up to 380° C., then it is gradually decreased again down to 20° C. according to a reverse gradient of 20° C. per minute.

The crystallization is studied during the cooling step. The heat flow is measured as a function of temperature, and a curve representing the change in the heat flow as a function of temperature is obtained for each sample studied. The crystallization temperature, denoted $T_c$ and expressed in degrees Celsius, is then determined for each sample, by projecting the maximum of the corresponding curve onto the axis of the abscissae. This determination is carried out directly by the DSC apparatus used. The crystallization temperature $T_c$ measured for each sample E1 to E3 is given in table V below.

Isothermal Crystallization

A DSC analysis under isothermal conditions was also performed on the samples E1 to E3 to measure the crystallization half-time. For this purpose, the isothermal DSC protocol comprises the following three steps: a first step consists in first stabilizing the temperature at 20° C., a second step then consists in gradually increasing the temperature according to a gradient of 20° C. per minute up to 380° C. Finally, the temperature is reduced from 380° C. down to 315° C., according to a gradient of 20° C. per minute, then it is stabilized at 315° C. for one hour.

TABLE VI

| Reference samples | Description | $T_c$ (° C.) | Crystallization half-time at 315° C. (min) |
|---|---|---|---|
| E1 | Control PEKK granules | 292 | 3.1 |
| E2 | (Control PEKK + 1000 ppm $NaH_2PO_4$) granules | 296 | 2.2 |
| E3 | (PEKK + 1000 ppm $Na_3P_3O_9$) granules | 301 | 1.2 |

It emerges from table VI of results obtained that the crystallization half-time is approximately 3.1 minutes for the sample E1 of control PEKK granules. The crystallization half-time of a polymer is the time required for crystallization of 50% of this polymer.

The crystallization half-time of the samples E2 and E3, the composition of which comprises phosphate salts, is reduced while the crystallization temperature increases. This phenomenon is due to the nucleation effect of the phosphate salts. Thus, for large bars obtained with such a composition, the nucleation effect makes it possible to avoid the appearance of large crystallized zones and to obtain good mechanical properties.

Regarding the granules intended to be used in injection molding or in extrusion, the accelerated crystallization makes it possible to control the crystalline morphology and especially the size of the spherulites, and to thereby ensure specific mechanical properties and consistency of the latter.

Regarding the granules intended to be used by the aqueous impregnation route, hydrated phosphate salts may be used in the composition. Anhydrous phosphate salts are, however, preferred since water may be released during the subsequent processing of the composition, which may lead to a possible negative effect on the physical properties of the composition.

Phosphate salts are thus good stabilizers of PAEKs and more particularly, but not exclusively, of PEKKs. These phosphate salts also combine several very advantageous effects. Indeed, they provide temperature stability in the absence or in the presence of air, and they are stable with regard to hydrolysis, unlike other phosphorus-based stabilizers such as phosphites or phosphonites such as PEP-Q, and do not generate volatile organic compounds but simply steam. They also combine all the positive effects of a stabilizer for transformation: they make it possible to limit changes in color during transformation, they make it possible to improve the stability of the structure in the molten state, significantly reducing the change in the polymer chains and thereby making it possible to retain the crystalline and mechanical properties of the material. Finally, they act as a nucleating agent and a regulator of residual acids (buffer effect), with the result that they may also help protect equipment from corrosion.

Phosphate salts may also be readily incorporated into the PAEK polymer, either by impregnation in aqueous solution or by dry blending or else by compounding.

They may finally be used in synergy with other additives such as other stabilizers and/or nucleating agents for example, and in the presence of continuous or dispersed filler(s), and of plasticizers.

The invention claimed is:

1. A composition based on poly(arylene ether ketone) (PAEK) which is stable in the molten state under nitrogen and under air with regard to thermal oxidation,
    wherein the composition comprises a mixture of phosphate salts, wherein the mixture of phosphate salts comprises a first phosphate salt chosen among: anhydrous monosodium phosphate, monosodium phosphate monohydrate and monosodium phosphate dihydrate, and a second phosphate salt chosen among anhydrous disodium phosphate, disodium phosphate dihydrate, disodium phosphate heptahydrate, disodium phosphate octahydrate and disodium phosphate dodecahydrate,
    wherein the proportions of phosphate salts in the composition are between 100 ppm and 5000 ppm,
    wherein composition does not comprise any phosphite and/or any phosphonate.

2. The composition as claimed in claim 1, wherein the composition based on PAEK is a composition based on one of the following polymers: PEKK, PEEK, PEEKK, PEKEKK, PEEEK or PEDEK.

3. The composition as claimed in claim 1, wherein the composition based on PAEK is a poly(ether ketone ketone) (PEKK) composition.

4. The composition as claimed in claim 3, wherein the composition based on PAEK is a composition based on PEKK, and comprises, in addition to the PEKK, at least one of the following polymers: PEK, PEEKEK, PEEK, PEEKK, PEKEKK, PEEEK, PEDEK, with a content of less than 50% by weight of the composition.

5. The composition as claimed in claim 1, wherein the composition further comprises at least one filler and/or at least one other additive.

6. The composition as claimed claim 1, wherein the mixture of phosphate salts, also acts as nucleating agent within said composition.

7. The composition as claimed in claim 1, wherein the percentage change in the viscosity, measured in a molten state, under air, with an oscillation frequency of 0.1 Hz, and with a strain amplitude of 0.5% is lower than the one of said composition without the mixture of phosphate salts.

8. The composition as claimed in claim 1, wherein the mixture of phosphate salts is water-soluble.

9. The composition as claimed in claim 8, wherein the mixture of phosphate salts have been incorporated in the composition by wet impregnation of an aqueous solution thereof.

10. The composition as claimed in claim 1, wherein the mixture of phosphate salts have been incorporated by compounding.

11. A composition based on poly(arylene ether ketone) (PAEK) which is stable in the molten state under nitrogen and under air with regard to thermal oxidation, wherein the composition comprises a mixture of phosphate salts,
    wherein the proportions of phosphate salts in the composition are between 100 ppm and 5000 ppm,
    wherein composition does not comprise any phosphite and/or any phosphonate,
    wherein the mixture of phosphate salts comprises anhydrous monosodium phosphate and anhydrous disodium phosphate.

12. The composition as claimed in claim 1, wherein composition is stable at a temperature of greater than 350° C.

13. An object manufactured by a technology chosen from laser sintering, fused deposition modeling, molding, injection molding, extrusion, thermoforming, rotational molding, compression molding, compounding or impregnation, using a composition as claimed in claim 1.

14. The composition as claimed in claim 1, in the form of granules or in the form of a powder.

15. The composition as claimed in claim 1, wherein the mixture of phosphate salts is incorporated during a synthesis process of the PAEK.

16. A composition based on poly(arylene ether ketone) (PAEK) which is stable in the molten state under nitrogen and under air with regard to thermal oxidation, wherein the composition comprises a mixture of phosphate salts,
    wherein the proportions of phosphate salts in the composition are between 100 ppm and 5000 ppm,
    wherein composition does not comprise any phosphite and/or any phosphonate,
    wherein the composition based on PAEK is a poly(ether ketone ketone) (PEKK) composition,
    wherein the mixture of phosphate salts comprises anhydrous monosodium phosphate and anhydrous disodium phosphate.

17. The composition as claimed in claim 3, wherein the composition further comprises at least one filler and/or at least one other additive.

18. The composition as claimed claim 3, wherein the mixture of phosphate salts also acts as nucleating agent within said composition.

19. The composition as claimed in claim 3, wherein the percentage change in the viscosity, measured in a molten state, under air, with an oscillation frequency of 0.1 Hz, and with a strain amplitude of 0.5% is lower than the one of said composition without the mixture of phosphate salts.

20. The composition as claimed in claim 3, wherein the mixture of phosphate salts is water-soluble.

21. The composition as claimed in claim 20, wherein the mixture of phosphate salts have been incorporated in the composition by wet impregnation of an aqueous solution thereof.

22. The composition as claimed in claim 3, wherein the mixture of phosphate salts have been incorporated by compounding.

23. The composition as claimed in claim 3, wherein the mixture of phosphate salts is incorporated during a synthesis process of the PAEK.

24. The composition as claimed in claim 3, wherein composition is stable at a temperature of greater than 350° C.

25. The composition as claimed in claim 3, in the form of granules or in the form of a powder.

* * * * *